(12) United States Patent
Sekine et al.

(10) Patent No.: US 6,466,576 B2
(45) Date of Patent: *Oct. 15, 2002

(54) ATM SWITCHING UNIT

(75) Inventors: Shigeru Sekine; Eiji Ishioka; Hiromi Odaka, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,140

(22) Filed: Mar. 23, 1998

(65) Prior Publication Data

US 2002/0075798 A1  Jun. 20, 2002

(30) Foreign Application Priority Data

Oct. 20, 1997  (JP) .............................. 9-287482

(51) Int. Cl.⁷ .............................................. H04B 29/00
(52) U.S. Cl. ...................... 370/395.1; 370/217; 370/225
(58) Field of Search ................................ 370/217, 218, 370/219, 220, 225, 227, 228, 236, 249, 395, 463

(56) References Cited

U.S. PATENT DOCUMENTS

| 5,631,896 A | * | 5/1997 | Kawase et al. ............. 370/228 |
| 5,671,215 A | * | 9/1997 | Foglar ........................ 370/217 |
| 5,715,237 A | * | 2/1998 | Akiyoshi ..................... 370/228 |
| 5,732,069 A | * | 3/1998 | Nagino et al. .............. 370/219 |
| 5,737,338 A | * | 4/1998 | Eguchi et al. .............. 370/249 |
| 5,757,796 A | * | 5/1998 | Hebb ........................... 370/393 |
| 5,764,624 A | * | 6/1998 | Endo et al. ................. 370/218 |
| 5,774,675 A | * | 6/1998 | Uchida ........................ 370/395 |
| 6,075,767 A | * | 6/2000 | Sakamoto et al. .......... 370/228 |

FOREIGN PATENT DOCUMENTS

JP          5268241       10/1993

* cited by examiner

Primary Examiner—Kwang Bin Yoa
Assistant Examiner—Frank Duong
(74) Attorney, Agent, or Firm—Katten Muchin Zavis Rosenman

(57) ABSTRACT

In an ATM switching unit, action information indicative of a cell of a presently operable system is stored into such a cell received from a line which is used as the line for the presently operable system, among cells received from duplicated lines, and also standby information indicative of a cell of a spare operation system is stored into such a cell received from a line which is used as the line for the spare operation system in an individual unit. Thereafter, the cells are transferred to a common unit. In this common unit, the cell into which the standby information has been stored is discarded by an IVC unit. Subsequently, transfer destination address information of the cell into which the action information has been stored is specified, and this specified cell is transferred to an output path thereof.

7 Claims, 12 Drawing Sheets

ATM SWITCHING UNIT

BACKGROUND OF THE INVENTION

The present invention relates to an ATM switching unit, and more specifically, to an ATM switching unit for accommodating a duplicated ATM cell transfer line.

In an ATM (Asynchronous Transfer Mode) network, ATM switching unit (ATM switching units) are provided as nodes (switching points) for constituting the ATM network. The ATM switching unit connects a plurality of lines for constituting the ATM network (a plurality of reception lines and a plurality of transmission lines). Then, when a cell transmitted from another transfer apparatus (another ATM switching unit, etc.) is received from the reception line, the ATM switching unit transmits the cell from the transmission line functioning as an output path by using transfer path information stored in a header of this received cell.

As transfer path information of a cell, a VPI (virtual path identifier)/VCI (virtual channel identifier) are stored in a header of a cell. The ATM switching unit contains a line processing unit for converting a VPI/VCI into address information about a counter party (transfer destination), and an ATM switch for switching a cell to any one of plural transfer lines based on this address information. Then, when the line processing unit and the switch are actuated, a plurality of cells which are received by the same ATM switching unit and contain the same VPIs/VCIs are transmitted from the same transfer line in this same ATM switching unit.

By the way, a memory capacity employed in the ATM switching unit is limited. For this reason, in the line processing unit and the switch, the above-explained address converting process and routing process cannot be carried out while directly using a VPI (12 bits) and a VCI (16 bits) of a received cell. Therefore, the line processing unit converts the VPI/VCI of the received cell into 13-bit reduced information (path identifier) called as an ICID-A, and executes the above-explained address converting process and routing process with employment of this ICID-A.

Also, there are duplicated lines connected in the ATM switching unit in view of important factors of transferred data. In other words, lines connected in the ATM switching unit are constructed of a working line for a presently operable system and a protection line for a spare operation system, and cell transmission is carried out by employing this working line under normal condition, whereas when a failure happens to occur in this working line, this troubled working line is switched to the protection line so as to perform the cell transmission.

FIG. 12 is a functional block diagram for showing an arrangement of a line processing unit (input line processing unit) 1 containing a duplicated line in a conventional ATM switching unit. In this drawing, the line processing unit 1 is arranged by an individual unit, a VCC table (common unit) 3, and an address converting unit 4 provided in the VCC table 3. The individual unit is constituted by a reducing unit ACT (action) connected to a working line WL, and a reducing unit SBY (standby) connected to a protection line PL. The VCC table (common unit) 3 is connected to the reducing unit ACT and the reducing unit SBY, respectively. Then, the VCC table 3 of the line processing unit 1 is connected to a switch 5.

Both the working line WL and the protection line PL transfer the same cell, and the same cell is entered via either the working line WL or the protection line PL to the reducing unit ACT and the reducing unit SBY. When a cell is inputted, both the reducing unit ACT and the reducing unit SBY convert a VPI/VCI stored in a header of this inputted cell into an ICID-A, and thereafter transmit the cell toward the VCC table 3.

In this case, the cell entered into the reducing unit SBY corresponds to a spare cell, and therefore is not required unless a failure happens to occur in the working line WL. As a result, the cell sent out from the reducing unit SBY is forcibly discarded before being entered into the VCC table 3 under such an initial condition that no failure happens to occur in the working line WL. Accordingly, only the cell sent out from the reducing unit ACT is inputted into the VCC table 3. As a result, the following problem can be avoided. That is, the spare cell will flow into the ATM switching unit, and thus may give the unnecessary processing workload to this ATM sustaining apparatus.

On the other hand, the cell sent out from the reducing unit ACT is entered into the address converting unit 4 of the VCC table. Upon receipt of the cell sent out from the reducing unit ACT, the address converting unit 4 converts the ICID-A saved in the header of this cell into address information about a counter party, and then transfers the cell to the switch 5. Then, when the switch 5 receives the cell from the VCC table 3, this switch 5 performs the switching operation in accordance with the address information stored in the header of this cell.

However, the above-described line processing unit 1 of the conventional ATM switching unit owns the following problems. That is, the presently available ATM switching unit is capable of connecting, for instance, 16 sets of lines at maximum, and is provided with the reducing units, the total number of which is selected in accordance with a total number of lines to be connected in order to house the respective lines. The respective reducing units are connected to the VCC table 3. To simplify the structure of the presently available ATM switching unit, the duplicated line are set as follows: Only when the reducing unit SBY for connecting the protection line PL is installed adjacent to the reducing unit ACT for connecting the working line WL, the cell transferred to the protection line PL is forcibly discarded. In other words, the discarding process of the cell transferred to the spare cell line is carried out based upon the connecting position of the duplicated lines.

For that reason, in such a case that the protection line PL is connected in such a reducing unit located apart from namely not located adjacent to the reducing unit for connecting the working line WL, the cell transferred via the protection line PL is not discarded before being entered into the VCC table 3, but would flow into the ATM switching unit.

As a consequence, in the case that a user who presently uses a single cell line wants to duplicate the cell lines in the conventional ATM switching unit, such a reducing unit must be empty which is located adjacent to the reducing unit into which this single cell line has been connected. Also, when duplicated lines are newly set in the conventional ATM switching unit, two sets of reducing units located adjacent to each other should be empty.

SUMMARY OF THE INVENTION

In view of the above-mentioned problems, the present invention has been made, and therefore, it is an object of the present invention to provide an ATM switching unit capable of discarding a cell transferred to a spare cell line irrespective of connecting positions of duplicated lines, and thus capable of more properly duplicating lines.

To solve the above-described problems, an ATM switching unit of the present invention may employ the following arrangements:

That is, an ATM switching unit according to a first aspect of the present invention is comprised of: cell receiving means for receiving the same cells from two lines through which the same cells are transferred; cell information storing means for storing specific information indicative of a cell of a presently operable system into only the cell received from one line among the cells received by the cell receiving means, and for storing the specific information into only the cell received from the other line when a failure happens to occur in the one line; discarding means for receiving the cells from the cell information storing means to discard such a cell into which the specific information is not stored; and transferring means for specifying an output path of such a cell which is not discarded by the discarding means, and for transferring the cell to the output path.

In accordance with the first aspect of the present invention, when the failure does not occur in one line, the cell information storing means stores the specific information into only the cell received from one line, whereas when the failure happens to occur in one line, the cell information storing means stores the specific information into only the cell received from the other line, among the cells inputted into the cell receiving unit. Thereafter, the cell is entered into the discarding means. The cell discarding means discards such a cell into which the specific information is not stored as the cell of the spare operation system. Thereafter, the transmission ring means transfers such a cell which is not discarded by the discarding means, namely the cell of the presently operable system to the output path thereof.

An ATM switching unit according to a second aspect of the present invention is comprised of: cell receiving means for receiving the same cells from two lines through which the same cells are transferred; cell information storing means for storing specific information indicative of a cell of a presently operable system into only the cell received from one line, among the cells received by the cell receiving means; and for storing the specific information into only the cell received from the other line when a failure happens to occur in the one line; discarding means for receiving the cells from the cell information storing means to discard such a cell into which the specific information has been stored; and transferring means for specifying an output path of such a cell which is not discarded by the discarding means, and for transferring the cell to the output path.

In accordance with the first aspect and the second aspect of the present invention, the cell discarding means discards the cell of the spare operation system based on the specific information stored in the cell. In other words, the cell discarding process based on the connecting position of the duplicated line is not carried out. For that reason, the cell of the spare operation system can be discarded irrespective of the connecting position of the duplicated lines. Accordingly, since the process operation by the ATM switching unit for the cell of the spare operation system can be avoided, it is possible to prevent the unnecessary processing workload from being given to the ATM switching unit.

An ATM switching unit according to the first and second aspects of the present invention is preferably arranged by that in the case that there are plural output paths of the cell which is not discarded by the discarding means, the transferring means copies the cell to produce a plurality of copied cells, a total number of which is determined in correspondence with a total number of the plural output paths, and transfers the plural copied cells to the plural output paths. With this, when the lines on the downstream side of the cell are duplicated, the cell can be sent to the respective lines. Also, the cell may be multi-cast.

Also, an ATM switching unit according to a third aspect of the present invention is comprised of: a first reception line connecting unit for connecting a reception line of a presently operable system; a second reception line connecting unit for connecting a reception line of a spare operation system, through which a cell identical to a cell transferred through the reception line of the presently operable system is transferred; a transfer line connecting unit for connecting a transfer line through which the cell is transmitted, the cell being inputted into any one of the first reception line connecting unit and the second reception line connecting unit; detecting means for detecting a failure occurred in the reception line of the presently operable system; cell information storing means for storing cell specific information indicative of the cell of the presently operable system into the cell inputted into the first line connecting unit, and for storing the cell specification information into the cell entered into the second reception line connecting unit instead of the cell entered into the first reception line connecting unit when the failure occurred in the reception line of the presently operable system is detected by the detecting means; cell discarding means for receiving the cells from the first reception line connecting unit and the second reception line connecting unit to discard such a cell into which the cell specific information is not stored; and cell transferring means for transferring the cell of the presently operable system to the transfer line connecting unit based on transfer destination address information of the cell, which has been stored in a header of the cell of the presently operable system, being equal to the cell not discarded by the cell discarding means.

The ATM switching unit according to the third aspect of the present invention is preferably further comprised of: judging means for judging whether or not the transfer line connected in the transfer line connecting unit is equal to the transfer line of the presently operable system for constituting a duplicated line based on the transfer destination address information of the cell of the presently operable system; and second call transferring means for copying the cell of the presently operable system when the judging means judges that the transfer line connected to the transfer line connecting unit is equal to the transfer line of the presently operable system, and for transferring the duplicated cell to a second transfer line connecting unit for connecting a transfer line of a spare operation system which constitutes a pair together with the transfer line of the presently operable system. With this arrangement, the cells having the same contents can be transmitted to the transfer line of the presently operable system, and also to the transfer line of the spare operation system on the transmission side of the ATM switching unit.

Also, the ATM switching unit according to the third aspect of the present invention is preferably further comprised by that: in the ATM switching unit, there are provided a plurality of the transfer line connecting units; and the ATM switching unit is further comprised of: judging means for judging whether or not the cell of the presently operable system should be transmitted to at least two transfer lines among the plurality of transfer lines connected to the plurality of transfer line connecting units based upon the transfer destination address information of the cell of the presently operable system; when the judging means judges that the cell of the presently operable system should be transmitted to at least two transfer lines, specifying means for specifying a transfer line connecting unit for connecting at least two transfer lines; copying means for copying the cell of the presently operable system in correspondence with the number of transfer line connecting units specified by the specifying means; and cell transferring means for transferring both the cell of the presently operable system and the cell copied by the copying means to the transfer line connecting unit specified by the specifying means.

Also, the ATM switching unit according to the third aspect of the present invention is preferably further comprised of: first header converting means for converting both a virtual path identifier and a virtual channel identifier into first reduced information, the virtual path identifier and the virtual channel identifier being stored in the headers of the cells inputted into the first reception line connecting unit and the second reception line connecting unit; second header converting means for converting the first reduced information stored in the header of the cell of the presently operable system into second reduced information produced by reducing the first reduced information and the output path information of the cell of the presently operable system; and third header converting means for converting the second reduced information stored in the header of the cell of the presently operable system into the transfer destination address information of the cell of the presently operable system.

With employment of the above-described arrangements, both the virtual path identifier and the virtual channel identifier are converted into the first reduced information, so that the memory capacity employed in the ATM switching unit can be reduced. Also, the first reduced information and the output path information, which are required to acquire the transfer destination address information of the cell, are reduced to the second reduced information. As a result, the memory capacity required to process the cells can be suppressed.

In accordance with the ATM switching unit of the present invention, the cell of the spare operation system can be discarded irrespective of the connecting positions of the duplicated lines. As a consequence, the lines can be duplicated with higher flexibility than that of the conventional ATM switching unit.

BRIEF DESCRIPTION OF THE DRAWINGS

A more complete understanding of the teachings of the present invention may be acquired by referring to the accompanying figures, in which.

DETAILED DESCRIPTION OF THE PREFERRED EMBODIMENTS

Referring now to drawings, various embodiments of the present invention will be described.

EMBODIMENT 1

First, an overall arrangement of an ATM switching unit according to an embodiment 1 of the present invention will now be explained.

<OVERALL ARRANGEMENT OF FIRST ATM SWITCHING UNIT>

Figure 1:
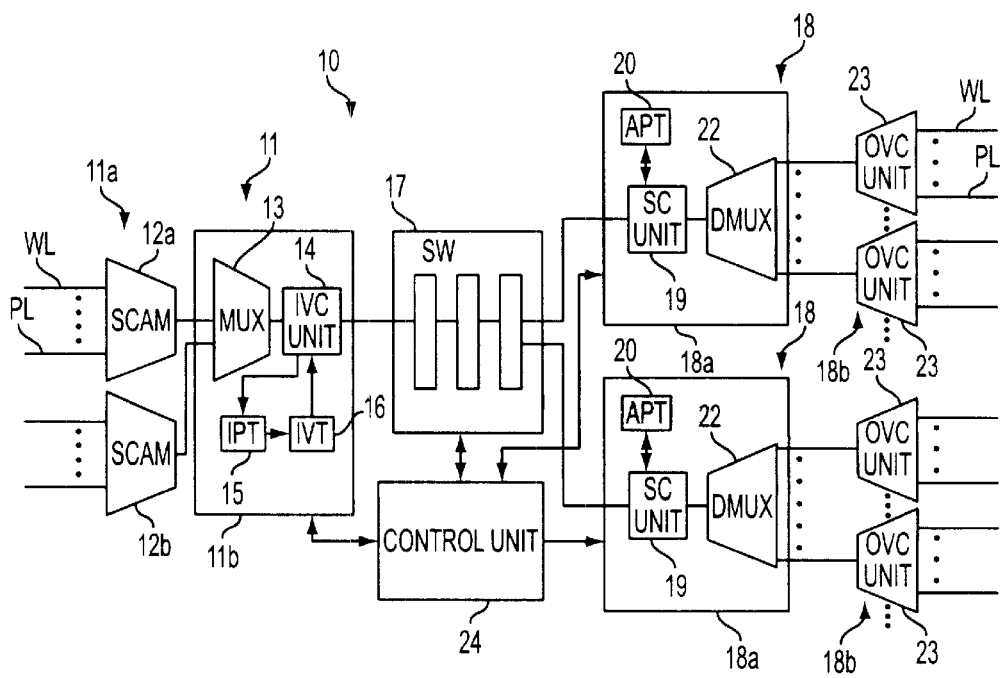
FIG. 1 is a schematic block diagram for indicating an entire arrangement of an ATM switching unit according to an embodiment mode 1 of the present invention.
Figure 1:
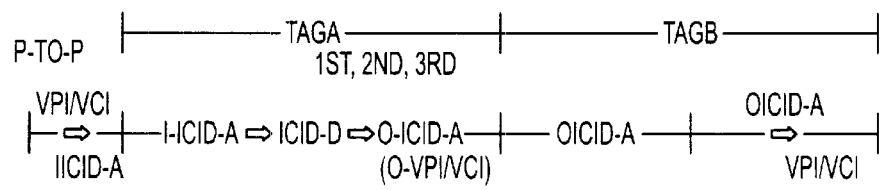

FIG. 1 is a schematic block diagram for representing an overall arrangement of an ATM switching unit 10 according to the first embodiment of the present invention.

In FIG. 1, the ATM switching unit 10 is comprised of an input line processing unit (IN AIFSH) 11 for connecting a reception line, a switch (SW) 17 connected to the input line processing unit 11, a plurality of output line processing units (IN AIFSH) 18 each connected to the switch 17, and a control unit 24 for controlling operations of the input line processing unit 11, the switch 17, and the respective output line processing units 18.

Then, a cell transfer apparatus (for instance, user terminal unit, another ATM switching unit (ATM-HUB, ATM router), and the like; not shown) is connected via the reception line to the input line processing unit 11 of the ATM switching unit 10. On the other hand, another cell transfer apparatus (not shown) is connected to a transfer line to the output line processing units 18 of the ATM switching unit 10.

In this case, FIG. 1 represents the arrangement of this ATM switching unit 10 in such a case that a cell is transferred from a left side to a right side, as viewed in this drawing, in a point-to-point manner. In an actual ATM switching unit, the input line processing unit 11 is further equipped with the arrangement of the output line processing unit 18, and also the output line processing unit 18 is further equipped with the arrangement of the input line processing unit 11. As a consequence, the ATM switching unit 10 may transfer the cells in the bidirectional manner.

<ARRANGEMENT OF INPUT LINE PROCESSING UNIT>

Figure 2:
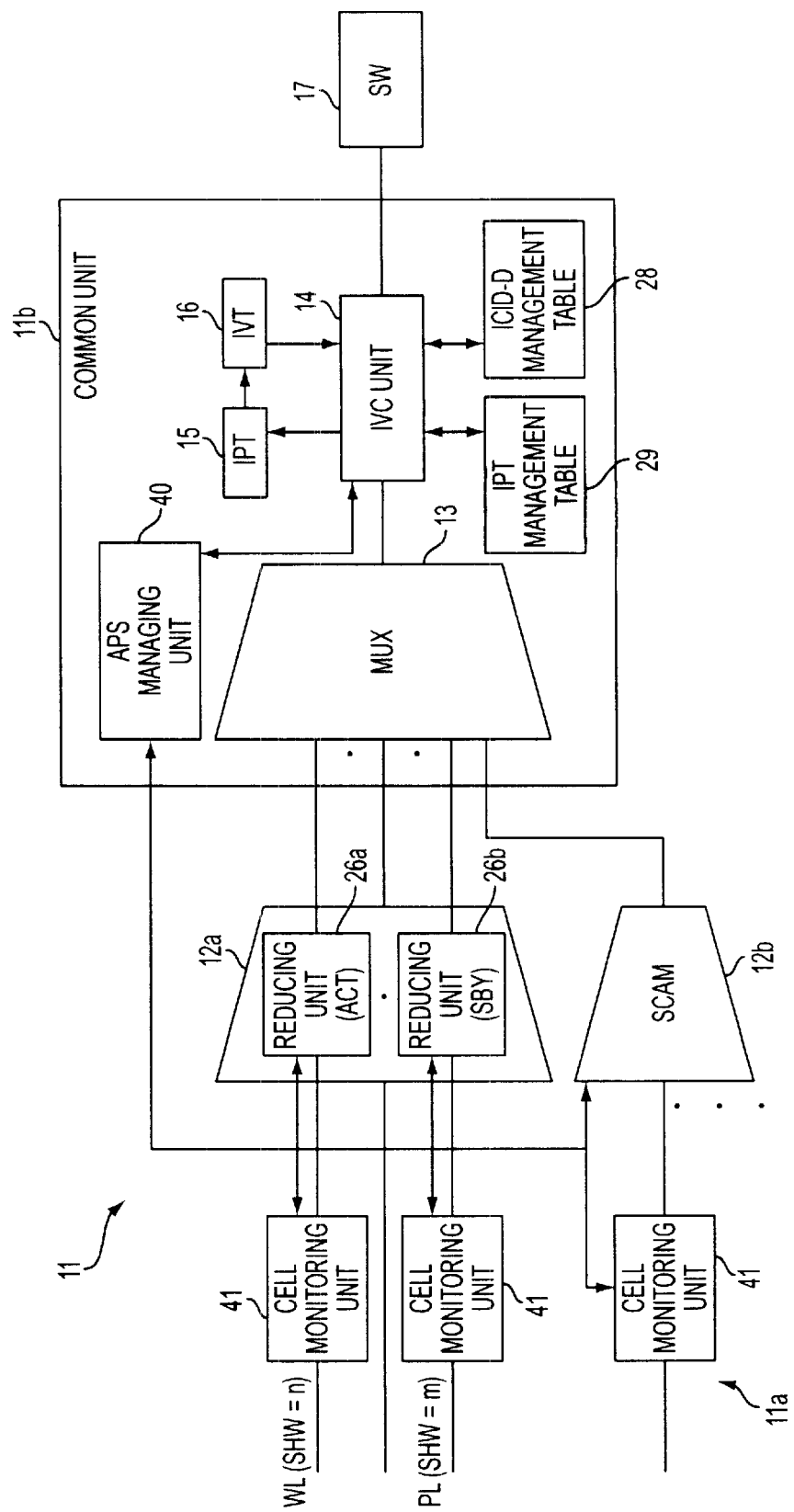
FIG. 2 schematically shows a structural diagram of an input line processing unit indicated in the ATM switching unit of FIG. 1.

FIG. 2 is a structural diagram of the input line processing unit 11. As shown in FIG. 2, the input line processing unit 11 is constituted by an individual unit 11a, and a common unit 11b connected to this individual unit 11a. The individual unit 11a is constituted by a plurality of ports, or slots (not shown) for storing a plurality of reception lines, cell monitoring units 41 connected to the respective ports, and SCAMs 12a, 12b connected to the cell monitoring units 41. On the other hand, the common unit 11b is arranged by a multiplexer (MUX) 13 connected to the respective SCAMs 12a, 12b; an IVC unit 14 connected to the MUX 13; an IPT table 15 connected to the IVC unit 14; an IVT table 16 connected thereto; an ICID-D management table 28 connected thereto; an IDI management table 24 connected thereto; and also an APS (Automatic Protection System) managing unit 40.

In FIG. 2, each of the cell monitoring unit 41 monitors a state of a cell received from a port. In other words, every time the cell is received, the cell monitoring unit 41 notifies this cell reception to the APS managing unit 40. In this case, for example, when a cell to be received is not received for a time duration longer than a predetermined time duration, the cell monitoring unit 41 notifies this state to the APS managing unit 40. Also, the cell monitoring unit 41 judges as to whether or not a received cell contains an abnormal condition, and then notifies this judgment result to the APS managing unit 40. Thereafter, the cell monitoring unit 41 transfers the cell to the SCAM 12a, or 12b connected to this cell monitoring unit 41.

The respective SCAMs 12a and 12b own the same arrangements. Now, explaining one SCAM 12a, the SCAM 12a includes a reducing unit 26 in correspondence with a line to be connected thereto. It should be understood that FIG. 2 shows only a reducing unit 26a, and another reducing unit 26b, as the reducing unit 26 employed in the SCAM 12a. The reducing unit 26a is connected to the port for connecting a working line WL equal to a reception line of a presently operable system. The reducing unit 26b is connected to another port for connecting a protection line PL equal to another reception line of a spare operation system. The first-mentioned reducing unit 26a may constitute a reducing unit ACT, and the second-mentioned reducing unit 26b may constitute a reducing unit SBY.

In this case, the ATM switching unit 10 according to the embodiment 1 is capable of connecting 16 sets of lines at maximum in both the cell reception side and the cell transmission side. Then, to the SCAM 12a and the SCAM 12b, 8 ports (slots) for connecting the reception lines are connected. It should be noted that the SCAM is capable of connecting 16 ports at maximum, and a connecting number of port may be arbitrarily selected from 2 to 16. It should also be noted that when 16 ports are connected to the SCAM 12a, the other SCAM 12b is not required.

Then, it is assumed that the above-described working line WL is connected to an n-th (SHW=n) port among the 8 ports connected to the SCAM 12a, and the protection line PL is connected to an m-th (SHW=m) located apart from (namely, not adjacent to) the n-th port. Alternatively, these working line WL and protection line PL may be connected to ports located adjacent to each other irrespective of the positional relationship between the working line WL and the protection line PL.

The cells having the same contents transferred via either the working line WL or the protection line PL are inputted via the ports and the cell monitoring units 41 to these reducing units 26a and 26b. As a result, the reducing units 26a and 26b receive an I-ICID-A from the APS managing unit 40 of the common unit 11b, and convert the I-VPI/VCI stored in a header of the cell entered from the cell monitoring unit 41 into an I-ICID-A. In this case, the I-ICID-A is a VPI (12 bits)/VCI (16 bits) stored in the header of the cell, namely a 13-bit path identifier produced by reducing an I-VPI/VCI (Input-VPI/VCI).-C Also, the reducing units 26a and 26b accept from the APS managing unit 40, specific information (ACT information/SBY information) of a cell for indicating whether this cell corresponds to the cell of the presently operable system, or the cell of the spare operation system. Then, the reducing units 26a and 26b store this specific information into the header of the cell inputted from the cell monitoring unit 41. That is, in the example shown in FIG. 2, the reducing unit 26a stores the ACT information into the header of the cell, whereas the reducing unit 26b stores the SBY information into the header of the cell.

It should be understood that the specific information of the cell is not applied to the cell inputted to the reducing unit 26 for connecting a not-duplicated line. Thereafter, each of the reducing units 26 (reducing units 26a, 26b) sends the cell with the header into which the I-ICID-A has been stored to the MUX 13.

The MUX 13 of the common unit 1ib receives the cells from the SCAMs 12a and 12b, and then transmits the cell to the IVC unit 14. The IVC unit 14 receives the cell from the MUX 13, and converts the I-ICID-A stored into the header of this cell into address information of a counter party (transfer destination).

The IVC unit 14 is integrally formed by a converting circuit for performing a cell header converting operation, and a processor apparatus for executing a firmware used to perform a setting operation related to this cell header converting operation. Upon receipt of the cell from the MUX 13, this IVC unit 14 firstly converts the I-ICID-A stored in the header of this cell into an ICID-D. In this case, the ICID-D implies intermediate header information produced by reducing the I-ICID-A. In other words, the processor apparatus for constituting the IVC unit 14 fetches a specific ICID-D from the ICID-D management table 28 and the IPT management table 29 by executing the firmware, and then sets this fetched ICID-D to the IPT table 15.

Figure 3:
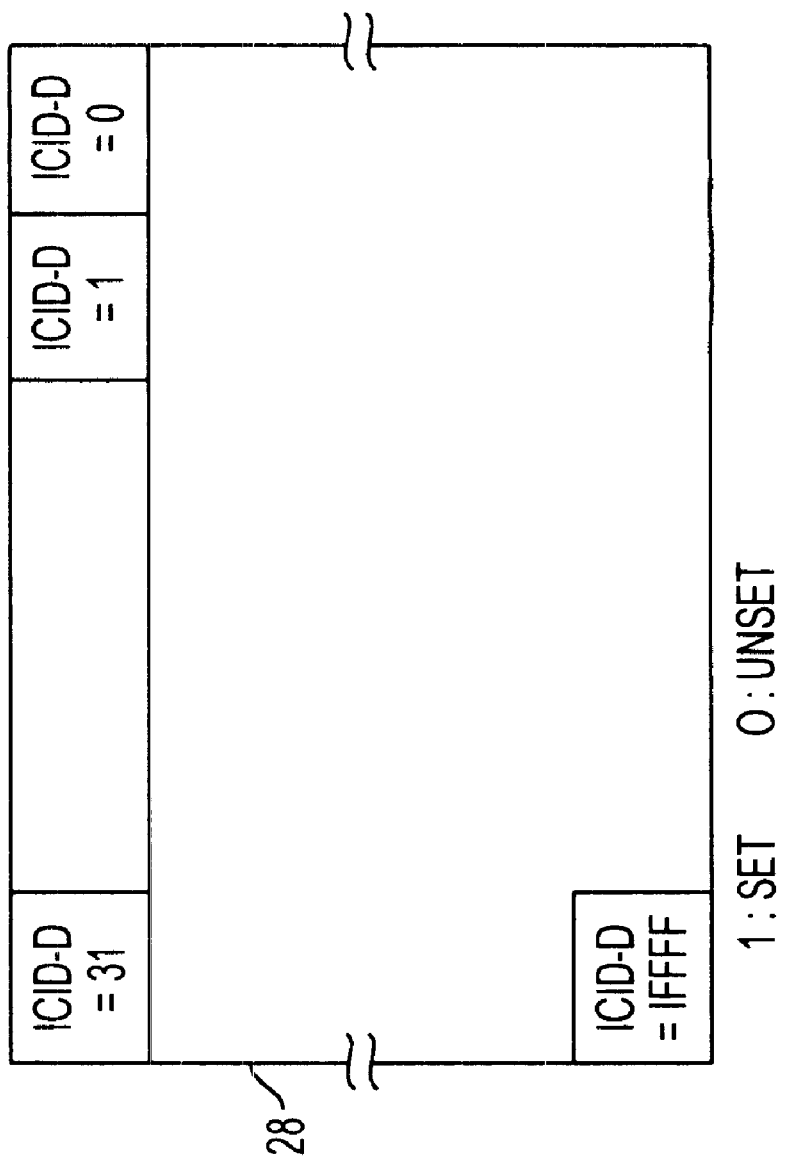
FIG. 3 is an explanatory diagram for explaining an ICID-D management table shown in FIG. 2.

FIG. 3 is an explanatory diagram for explaining a content of the ICID-D management table 28. In FIG. 3, the ICID-D management table 28 is a bit map table into which set/unset (use/unused) information as to a plurality of ICID-Ds has been stored. That is, a plurality of columns corresponding to a plurality of ICID-Ds are contained in the ICID-D management table 28, and 1-bit data indicative of set/unset information about the relevant ICID-D is stored into each of these columns. In this case, "1" is set as to the set ICID-D, and "0" is set as to the unset ICID-D.

Figure 4:
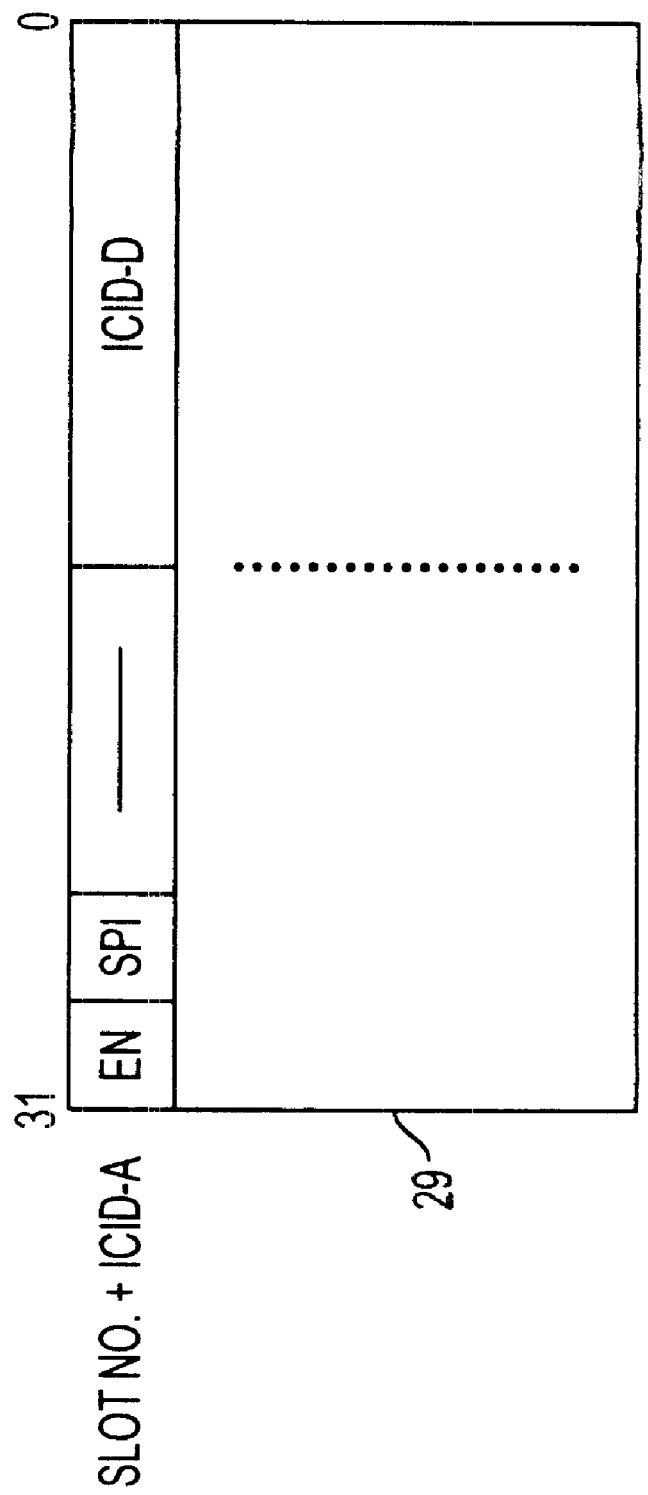
FIG. 4 is an explanatory diagram for explaining an IPT management table shown in FIG. 2.

FIG. 4 is an explanatory diagram for explaining a content of the IPT management table 29. In FIG. 4, into the IPT management table 29, a plurality of ICID-Ds corresponding to I-ICID-As are stored. Both the IPT table 15 and the IVT table 16 are tables used in a header converting process executed by the converting circuit of the IVC unit 14.

Before a cell is inputted into the IVC unit 14, the processor apparatus of the IVC unit 14 receives path information (I-ICID-A: 13 bits) of the cell and a slot number (number of port for receiving this cell: 4 bits) from the APS managing unit 40. As a result, the processor apparatus of the IVT unit 14 reads ICID-D corresponding to I-ICID-A, and the slot number from the IPT management table 29, and sets these ICID-D and slot number to the IPT table 15. Subsequently, the processor apparatus of the IVC unit 14 sets "1" corresponding to ICID-D read from the IPT management table 29 into the ICID-D management table 28.

Thereafter, when another cell is entered into the IVC unit 14, the converting circuit of the IVC unit 14 judges as to whether or not the ACT information is stored into the header of this cell. In such a case that the ACT information is stored in the header of the cell, the converting circuit of the IVC unit 14 judges that the present cell is a cell of the presently operable system. To the contrary, in the case that the SBY information is stored in the header of the cell, the converting circuit of the IVC unit 14 judges that the present cell is a cell of the spare operation system.

Then, the converting circuit of the IVC unit 14 discards the cell of the spare operation system based on the above-described judgment result. As a consequence, it is possible to avoid such a problem. That is, the cell of the spare operation system may flow into the switch 17 and the output line processing unit 18, so that unnecessary processing workloads are given to the IVC unit 14, the switch 17, and the output line processing unit 18.

Next, the converting circuit of the IVC unit 14 reads ICID-D set to the IPT table 15, and converts I-ICID-A stored into the header of such a cell which is judged as the cell of the presently operable system, into this ICID-D. As a result, 17-bit path information constructed of I-ICID-A and the slot number may be reduced to 13-bit ICIDD. Then, the cell into which this 13-bit ICID-D has been stored is transmitted to the IVT table 16.

Subsequently, when the cell is entered from the IPT table 15 to the IVT table 16, the converting circuit of the IVC unit 14 acquires O-ICID-A corresponding to ICID-D stored in the header of this cell from an O-ICID-A management table (not shown). Next, the converting circuit of the IVC unit 14 converts ICID-D stored in the header into the acquired O-ICID-A. In this case, O-ICID-A corresponds to a 13-bit path identifier produced by reducing VPI/VCI (O-VPI/VCI: Output-VPI/VCI) on the transmission side of a cell.

On the other hand, the converting circuit of the IVC unit 14 acquires TAG-A corresponding to ICID-D stored into the header of the cell from a TAG-A management table (not shown). Subsequently, the converting circuit of the IVC unit 14 stores the acquired TAG-A into the header of the cell. In this case, TAG-A corresponds to information (routing information of switch 17) for specifying the output line processing unit 18 to which such a cell should be transferred, and this cell is inputted into the switch 17 (see FIG. 1).

Also, the converting circuit of the IVC unit 14 acquires TAG-B corresponding to TAG-A stored into the header of the cell from a TAG-B management table (not shown either). Subsequently, the converting circuit of the IVC unit 14 stores the acquired TAG-B into the header of the cell. In this case, TAG-B corresponds to information about a port for connecting a transfer line through which the relevant cell is transmitted.

As previously explained, since the header converting process is carried out by the IVC unit 14, O-ICID-A, TAG-A and TAG-B are stored into the header of the cell, which constitute the address information of the counter party. Thereafter, this cell is inputted into the switch 17.

The APS managing unit 40 corresponds to such a function realized by executing a firmware stored in a memory (not shown) by way of a processor apparatus (not shown). Upon receipt of such a notification that a cell is received from each of the cell monitoring unit 41 of the individual unit 11a, this APS managing unit 40 applies I-ICID-A to the reducing unit 26 connected to this cell monitoring unit 41. At this time, when the cell managing unit 41 which has received the cell is connected to either the reducing unit 26a or the reducing unit 26b, the ASP managing unit 40 supplies the specific information of the cell to either the reducing unit 26a or the reducing unit 26b.

Also, upon receipt of such a notification that the cell is received from the cell monitoring unit 41, the APS managing unit 40 specifies the port through which this cell is received, and then supplies I-ICID-A and a slot number (port number) to the IVC unit 14, which correspond to this cell.

In the case that the APS managing unit 40 receives the below-mentioned notification from the cell monitoring unit 41 connected to the reducing unit 26a, the APS managing unit 40 recognizes that a failure happens to occur in the working line WL, and thus switches the troubled working line WL to the protection line PL. That is, such a fact that a cell to be received is not yet received during a time duration longer than a predetermined time duration is notified to this APS managing unit 40, or such a fact that an abnormal condition happens to occur in a cell is notified to this APS managing unit 40.

In other words, the APS managing unit 40 executes a self setting operation such that the reducing unit 26a is set as the reducing unit SBY and the reducing unit 26b is set as the reducing unit ACT. Thereafter, upon receipt of such a notification that a cell is received from the cell monitoring unit 41 connected to the reducing unit 26b, the APS managing unit 40 supplies I-ICID-A and ACT information corresponding to this received cell to the reducing unit 26b. On the other hand, upon receipt of such a notification that a cell is received from the cell monitoring unit 41 connected to the reducing unit 26a, the APS managing unit 40 supplies I-ICID-A and SBY information corresponding to this received cell to the reducing unit 26a. As a result, the cell transferred via the protection line PL may flow into the ATM switching unit 10 instead of the cell transferred via the working line WL, and then may be sent out from the ATM switching unit 10.

Figure 5:
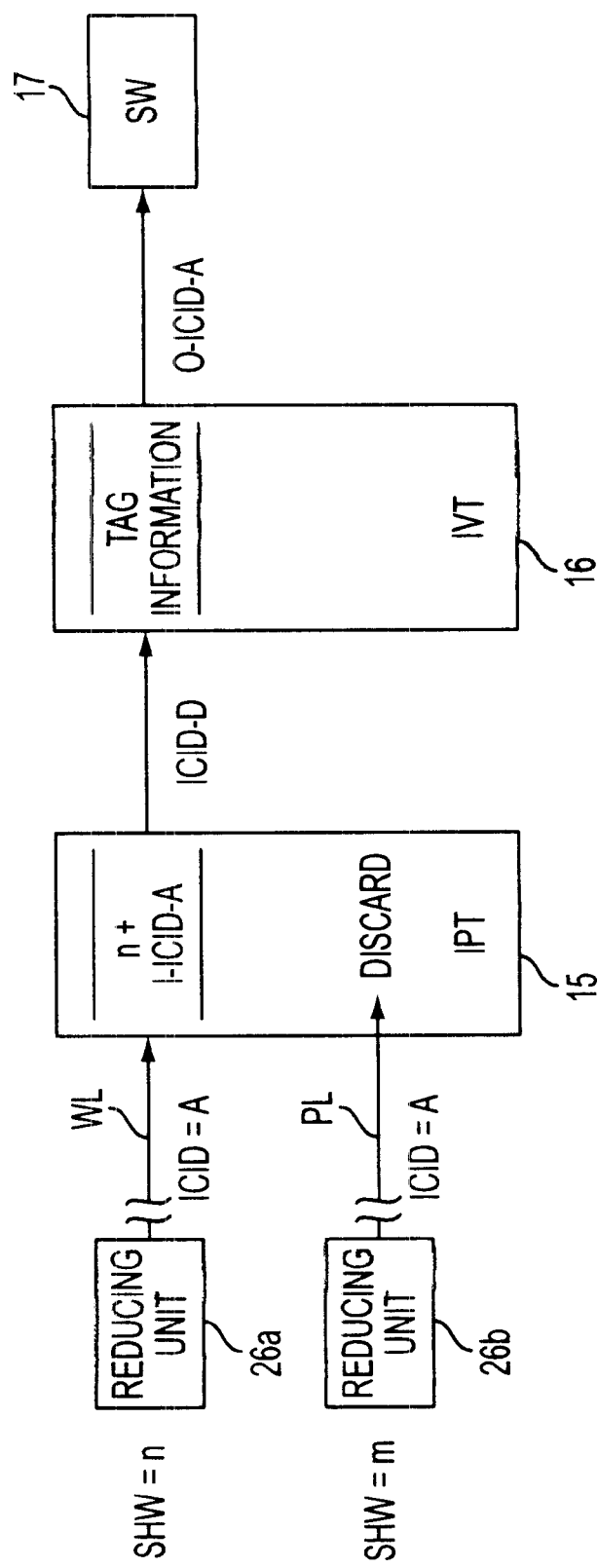
FIG. 5 is an operation explanatory diagram of the input line processing unit shown in FIG. 1.

FIG. 5 is a diagram for representing an example of operations of the IVC unit 14. As indicated in FIG. 5, the cells sent out from the respective reducing units 26a and 26b are entered via the MUX 13 and the IVC unit 14 to the IPT table 15. As a result, in this IPT table 15, the cell of the spare operation system, which is sent out from the reducing unit 26b, is discarded, and I-ICID-A stored in the header of the cell of the presently operable system, which is sent out from the reducing unit 26a, is converted into ICID-D.

Then, the cell of the presently operable system is inputted into the IVT table 16, ICID-D stored in the header of this cell is converted into O-ICID-A, and further both TAG-A and TAG-B are added to the header thereof. Thereafter, the cell is entered into the switch 17.

It should be understood that in the embodiment 1, after the cell of the spare operation system is discarded, I-ICID-A is converted into ICID-D as to the cell of the presently operable system in the IPT table 15. Alternatively, this ATM switching unit may be arranged in such a manner that after I-ICID-A is converted into ICID-D with respect to the cell of the presently available system and the cell of the spare operation system, the cell of the spare operation system may be discarded.

<STRUCTURE OF SWITCH>

When the cell is inputted from the IVC unit 14 to the switch 17 shown in FIG. 1, this switch 17 sends this input cell to any one of the plural output line processing units 18 based on TAG-A stored in the header of this cell.

<ARRANGEMENT OF OUTPUT LINE PROCESSING UNIT>

As indicated in FIG. 1, each of the output line processing units 18 is constituted by a common unit 18a connected to the switch 17, and an individual unit 18b connected to the common unit 18a. The common unit 18a is constructed of an SC unit 19 connected to the switch 17, an APT table 20 connected to the SC unit 19, and a demultiplexer (DMUX) 22 connected to the SC unit 19. On the other hand, the individual unit 18a is arranged by a plurality of OVC units 23 each connected to the DMUX 22. Then, each of the OVC units 23 owns a plurality of ports for connecting a plurality of transfer lines.

Figure 6:
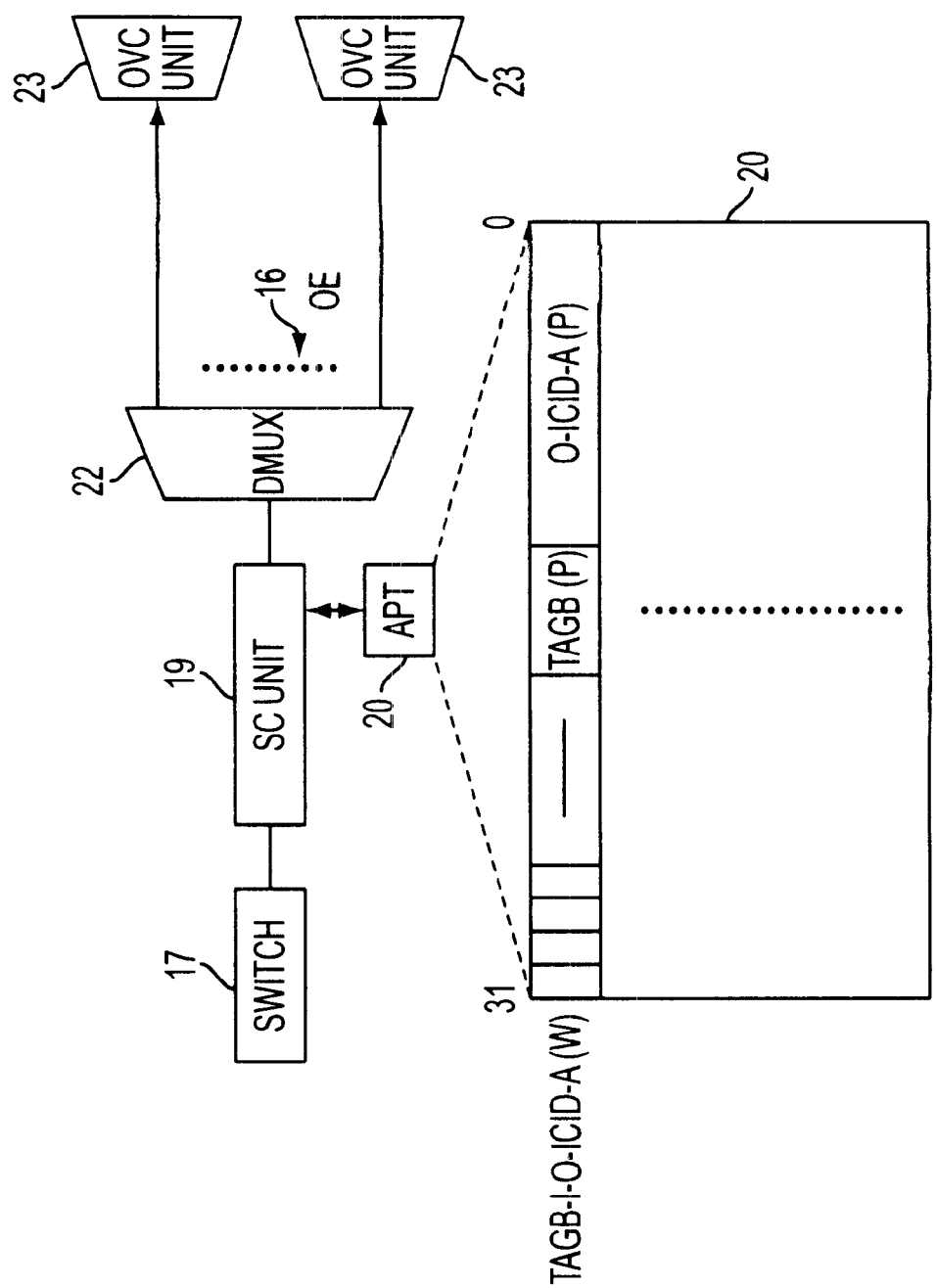
FIG. 6 schematically represents a structural diagram of a common unit employed in an output line processing unit shown in the ATM switching unit of FIG. 1.

FIG. 6 indicates a structural diagram of the common unit 18a. In FIG. 6, the SC unit 19 produces a cell of the spare operation system from the cell of the presently operable system, which is received from the switch 17, and sends out each cell to the DMUX 22. In other words, when the cell is received from the switch 17, the SC unit 19 specifies such a protection line PL on the transmission side, which may constitute a paired line with respect to the working line WL on the transmission side, through which this cell is sent out. Subsequently, the SC unit 19 copies this cell, and stores information about a port for connecting the protection line PL on the transmission side into a header of the copied cell. Then, both the cell received from the switch 17 and the copied cell are sent to the DMUX 22.

Concretely speaking, the APT table 20 indicated in FIG. 6 stores TAG-B and O-ICID-A of the cell which is transmitted to the protection line PL on the transmission side in correspondence with TAG-B and O-ICID-A of the cell sent to the working line WL on the transmission side. Upon receipt of the cell from the switch 17, the SC unit 19 extracts TAG-B and O-ICID-A from the header of this cell, and then reads TAG-B and O-ICID-A of the protection line PL on the transmission side corresponding thereto.

Next, the SC unit 19 copies the cell received from the switch 17, and stores TAG-B and O-ICID-A read from the APT table 20 into the header of the copied cell. Thereafter, the SC unit 19 transmits both the cell received from the switch 17 and the copied cell to the DMUX 22.

It should also be understood that when the relevant TAG-B and O-ICID-A cannot be detected from the APT table 20, the SC unit 19 may recognize that the transfer line of this cell is not duplicated (namely, only one line), and may send out the cell received from the switch 17 to the DMUX 22.

Upon receipt of the cell from the SC unit 19, the DMUX 22 sends out the cell to the OVC unit 23 having the port corresponding to the TAG-B stored in the header of this cell based upon this TAG-B.

Figure 7:
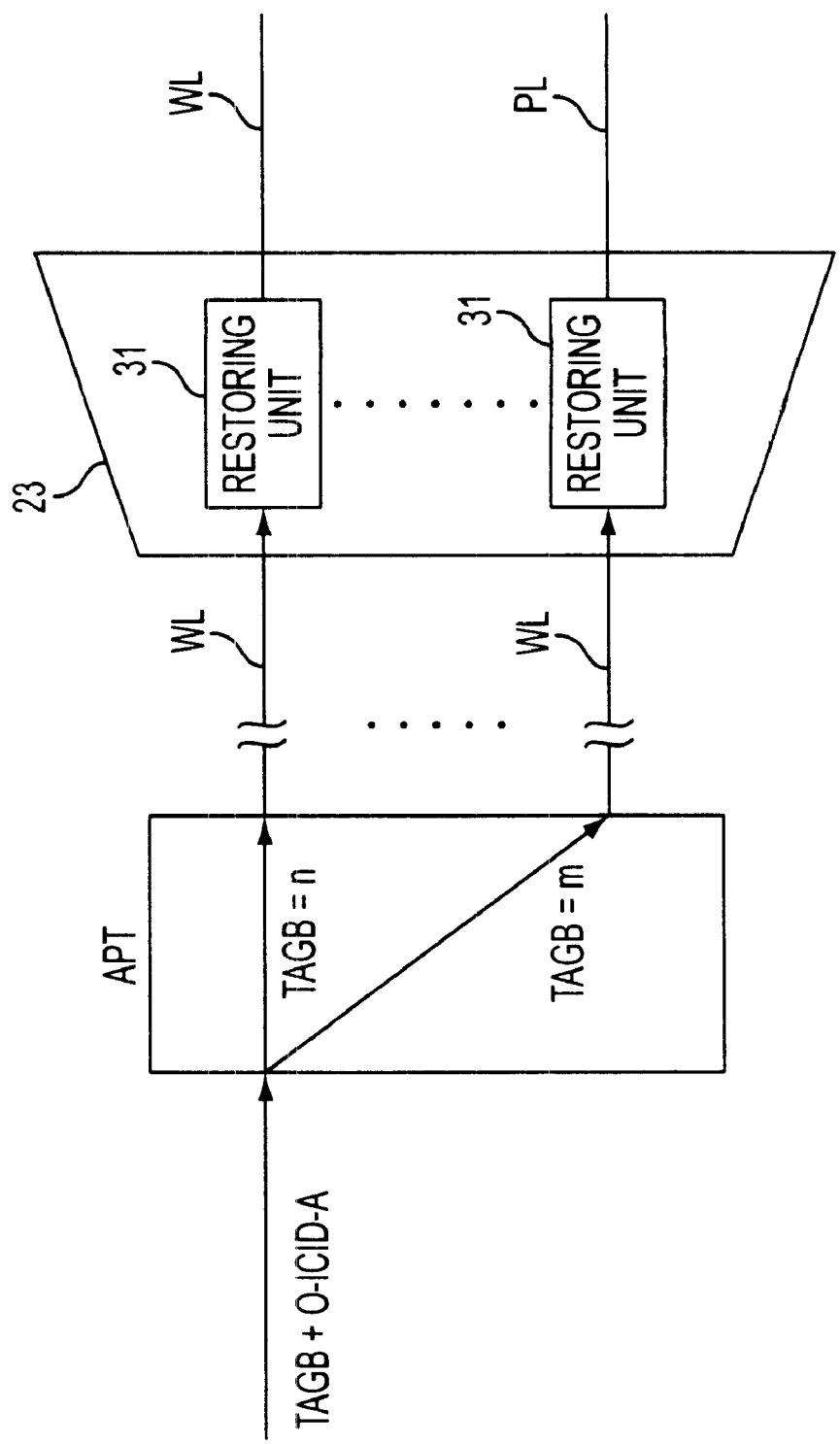
FIG. 7 is an operation explanatory diagram of the output line processing unit shown in FIG. 1.

FIG. 7 is a structural diagram of the individual unit 18b (OVC unit 23) employed in the output line processing unit 18. In FIG. 7, the OVC unit 23 includes a plurality of restoring units 31, the total number of which corresponds to a total number of ports for connecting transfer lines owned by the own OVC unit 23. Each of the restoring units 31 is connected to any one of the transfer lines via the port. Then, the cell sent from the DMUX 22 is inputted into the restoring unit 31 connected to such a port corresponding to TAG-B stored in the header of this sent cell.

When the cell is entered from the DMUX 22 into the restoring unit 31, the restoring unit 31 converts O-ICID-A stored in the header of this cell into O-VPI/VCI. Also, both TAG-A and TAG-B are deleted from the header. Thereafter, the cell is sent to the transfer line via the port connected to the relevant restoring unit 31. As a consequence, the cell is transferred to a transfer apparatus (not shown) connected to the ATM switching unit 10.

In the case that the transfer line of the cell is duplicated as the working line WL and the protection line PL, the cells having the same contents are sent out from the respective lines PL and WL in accordance with the above-explained arrangement of the output line processing unit 18.

<ADVANTAGES OF EMBODIMENT 1>

In accordance with the ATM switching unit 10 of the embodiment 1, the ACT information is stored by the reducing unit 26a into the header of the cell transferred through the working line WL, whereas the SBY information is stored by the reducing unit 26b into the header of the cell transferred via the protection information. Thereafter, the processor apparatus of the IVC unit 14 judges as to whether or not the ACT information has been stored in these cells, and discards such a cell which does not contain the ACT information, but contain the SBY information.

As previously described, since the discarding process operation for the cell of the spare operation system is carried out by the IVC unit 14 based on the ACT information/ SBY information, such a cell of the spare operation system can be discarded without the below-mentioned setting operation. That is, the reducing unit for connecting the protection line PL is provided adjacent to the reducing unit for connecting the working line WL, which is performed in the conventional ATM switching unit.

In other words, in accordance with the ATM switching unit 10 of this embodiment 1, the transfer lines can be duplicated and further the cell of the spare operation system can be discarded irrespective of the positional relationship between the reducing unit 26a for connecting the working line WL and the reducing unit 26b for connecting the protection line PL. As a result, in such a case that two lines cannot be connected to the reducing units located adjacent to each other, the following conventional problem does not occur. That is, in this case, the cell of the protection line PL will flow through the switch and the like.

Also, in accordance with the ATM switching unit 10 of the embodiment 1, since both I-ICID-A and the slot information required to specify O-ICID-A (O-VPI/VCI) of the cell are reduced to ICID-D on the basis of the IPT table 15, it is possible to avoid such a problem that the memory capacity of the common unit 11b is largely increased.

Moreover, in the conventional ATM switching unit 1, the lines are duplicated by setting the positions of the reducing units for connecting the working line WL and the protection line PL. To the contrary, in the ATM switching unit 10 of the embodiment 1, since the positions of the working line WL and the protection line PL need not be specified, the lines can be duplicated in unit of the connection (VPI/VCI unit). As a consequence, this ATM switching unit 10 can easily accept the line duplication requests made by the user with higher flexibility.

EMBODIMENT 2

Figure 8:
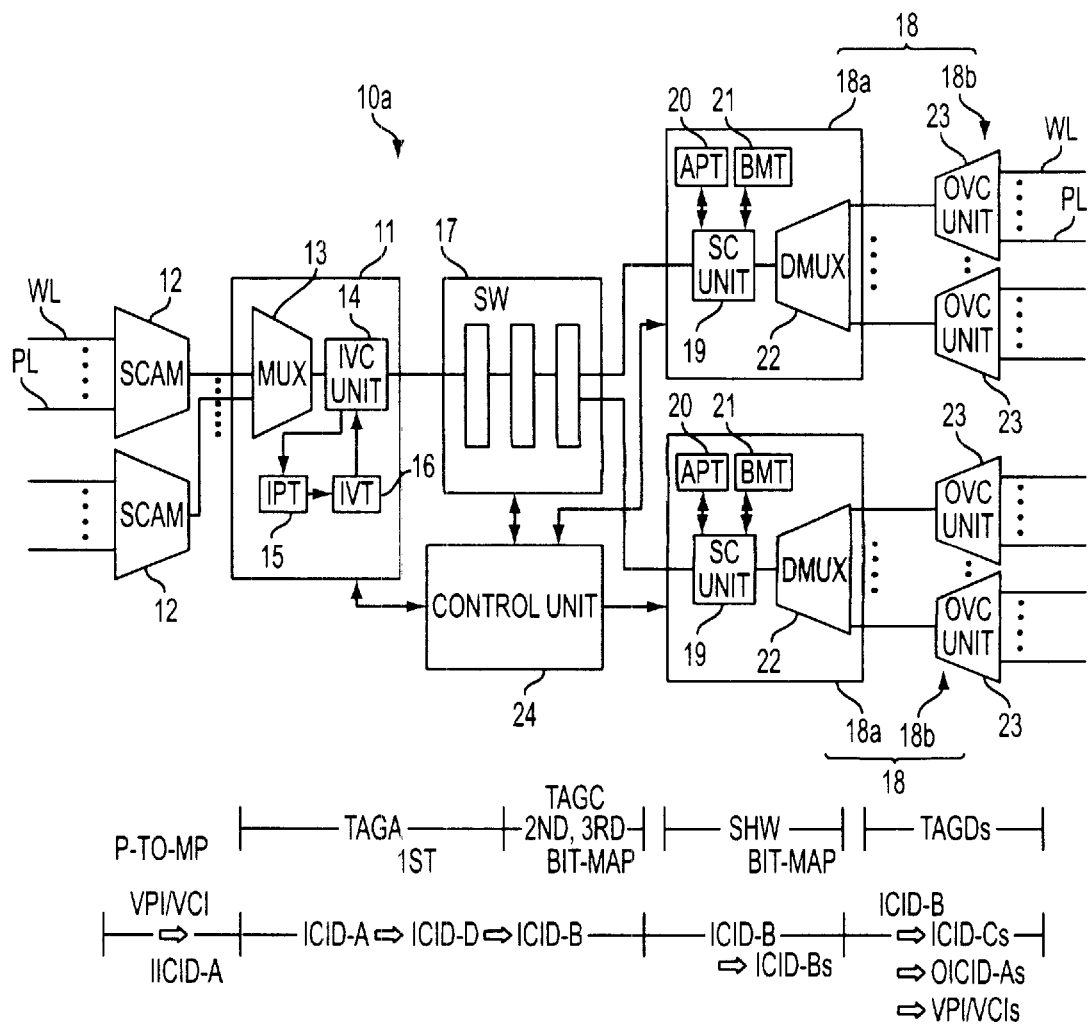
FIG. 8 is a schematic block diagram for indicating an overall arrangement of an ATM switching unit according to an embodiment mode 2 of the present invention.

Next, a description will now be made of an embodiment 2 according to the present invention. FIG. 8 schematically indicates an overall arrangement of an ATM (Asynchronous Transfer Mode) switching unit 10a accomplished in accordance with the embodiment 2. FIG. 8 represents such an arrangement of the ATM switching unit 10a that a cell is transferred from a left side to a right side, as viewed in this drawing, in a point-to-multipoint (P to MP) manner. It should be understood that since the ATM switching unit 10a according to the embodiment 2 owns the substantially same arrangement as that of the ATM switching unit 10 according to the embodiment 1, a different point thereof from the embodiment 1 will now be explained and a common point between them is omitted.

In FIG. 8, it is now assumed that the same cells are received via the working line WL and the protection line PL by the ATM switching unit 10a. As a result, these cells are inputted into the reducing units 26a and 26b (see FIG. 2) of the SCAM 12. Thus, I-VPI/VCI stored into the header of each cell is converted into I-ICID-A, and further either the ACT information or the SBY information is applied thereto. Thereafter, each of the cells is transmitted via the MUX 13 to the IVC unit 14.

When the respective cells are inputted into the IVC unit 14, based on either the ACT information or the SBY information stored in the header of the cell, the cell of the spare operation system (namely, cell sent from reducing unit 26b) is discarded, and I-ICID-A stored in the header of the cell of the presently operable system (namely, cell sent from reducing unit 26a) is converted into ICID-D. Thereafter, the cells are transferred to the IVT table 16.

Different from the embodiment 1, ICID-D stored in the header of the cell is converted into ICID-B in the IVT table 16, and this ICID-B corresponds to a path identifier used to multi-cast the cell from a plurality of transfer lines. In this case, if more than two sets of output line processing units 18 are provided which are required to receive the cell entered into the IVT table 16, then the cell is copied and ICID-D stored in the header of each cell is converted into ICID-B. Subsequently, TAG-C is stored into the respective headers of these cells, and this TAG-C corresponds to specific information of such an output line processing unit 18 to which the cell should be transferred. Then, the respective cells are transferred to the switch 17.

Figure 9:
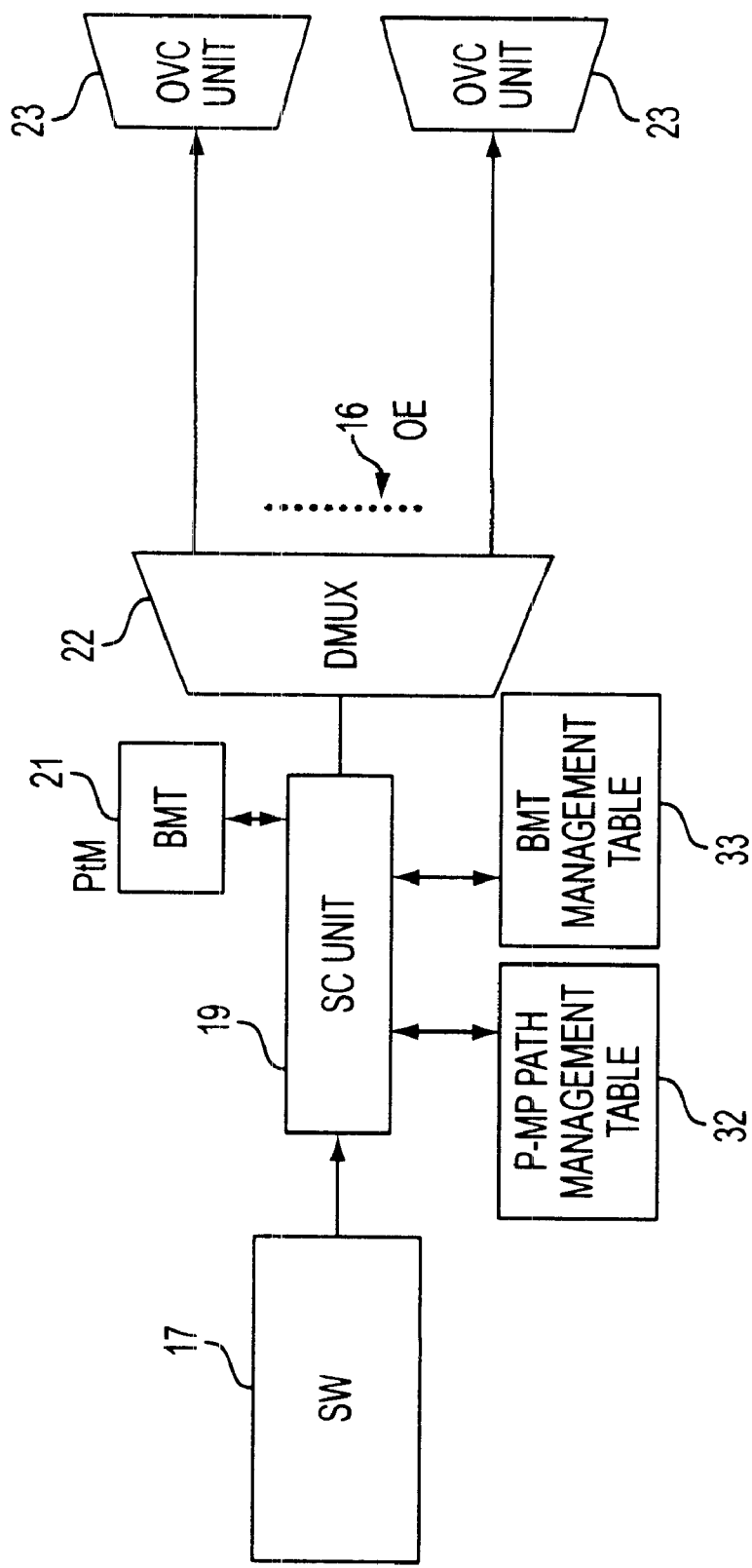
FIG. 9 schematically represents a structural diagram of a common unit employed in an output line processing unit shown in FIG. 8.
Figure 10:
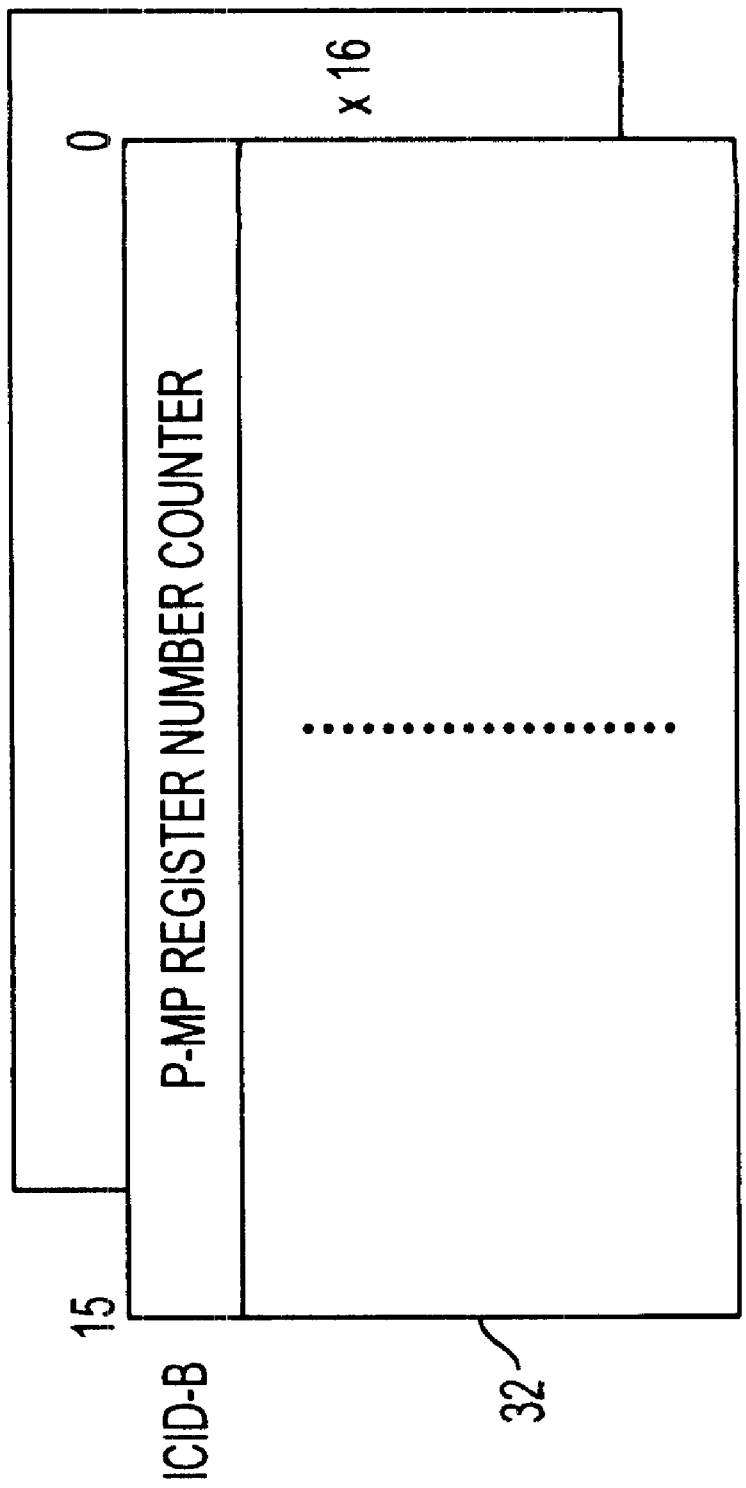
FIG. 10 is an explanatory diagram for explaining a PMP path number management table shown in FIG. 9.

Upon receipt of a cell from the IVC unit 14, the switch 17 transfers the cell to the output line processing unit 18 corresponding to TAG-C stored in a header of this received cell in accordance with this TAG-C. When the cell is entered into the common unit 18a in the output line processing unit 18, the SC unit 19 of the common unit 18a executes the following process operation. FIG. 9 is a structural diagram of the common unit 18a according to the embodiment 2. In FIG. 9, the common unit 18a includes a BMT table 21, a P-MP path management table 32, and a BMT management table 33, which are connected to the SC unit 19, different from the arrangement of the common unit 18a in the embodiment 1.

Figure 11:
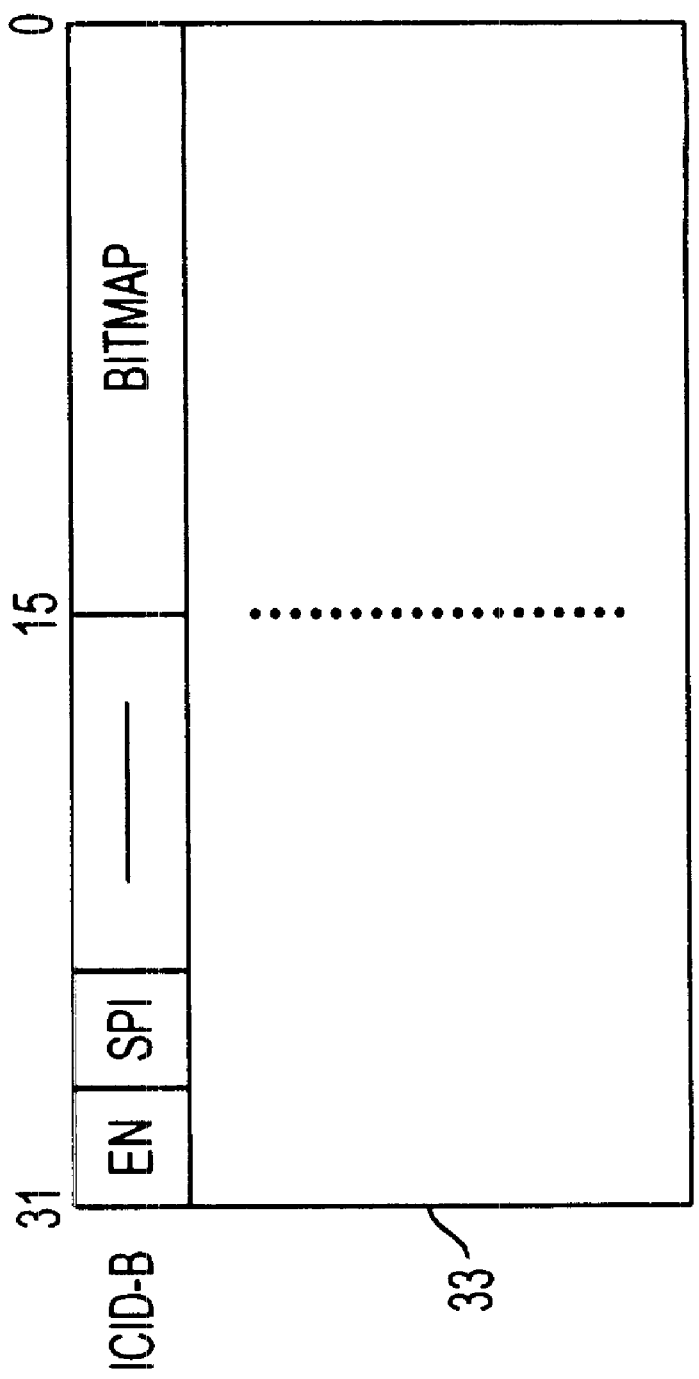
FIG. 11 is an explanatory diagram for explaining a BMT management table shown in FIG. 9.

FIG. 11 is an explanatory diagram for explaining a content of the P-MP path management table 32. As indicated in FIG. 11, the P-MP path management table 32 is a bit map table formed by that bits for specifying ports capable of connecting lines connected to the output line processing unit 18 have been stored in the order of the port numbers. In such a case that a multi-cast is designated to a cell (namely, ICID-B is stored in header of cell among a plurality of bits stored in the P-MP path management table 32, "1" is set to such a bit corresponding to a port to which this multi-cast cell is transmitted, whereas "0" is set to such a bit corresponding to a port to which no multi-cast cell is transmitted.

When a multi-cast is designated to a cell received by the ATM switching unit 10a, the SC unit 19 retrieves this P-MP path management table 32 so as to judge whether or not there is such a port from which the cell is sent out (namely, whether or not bit of "1" is present). Subsequently, when the SC unit 19 judges that there is the port from which the cell is sent out, the SC unit 19 reads this bit map and stores the read bit map into the BMT management table 33.

Figure 12:
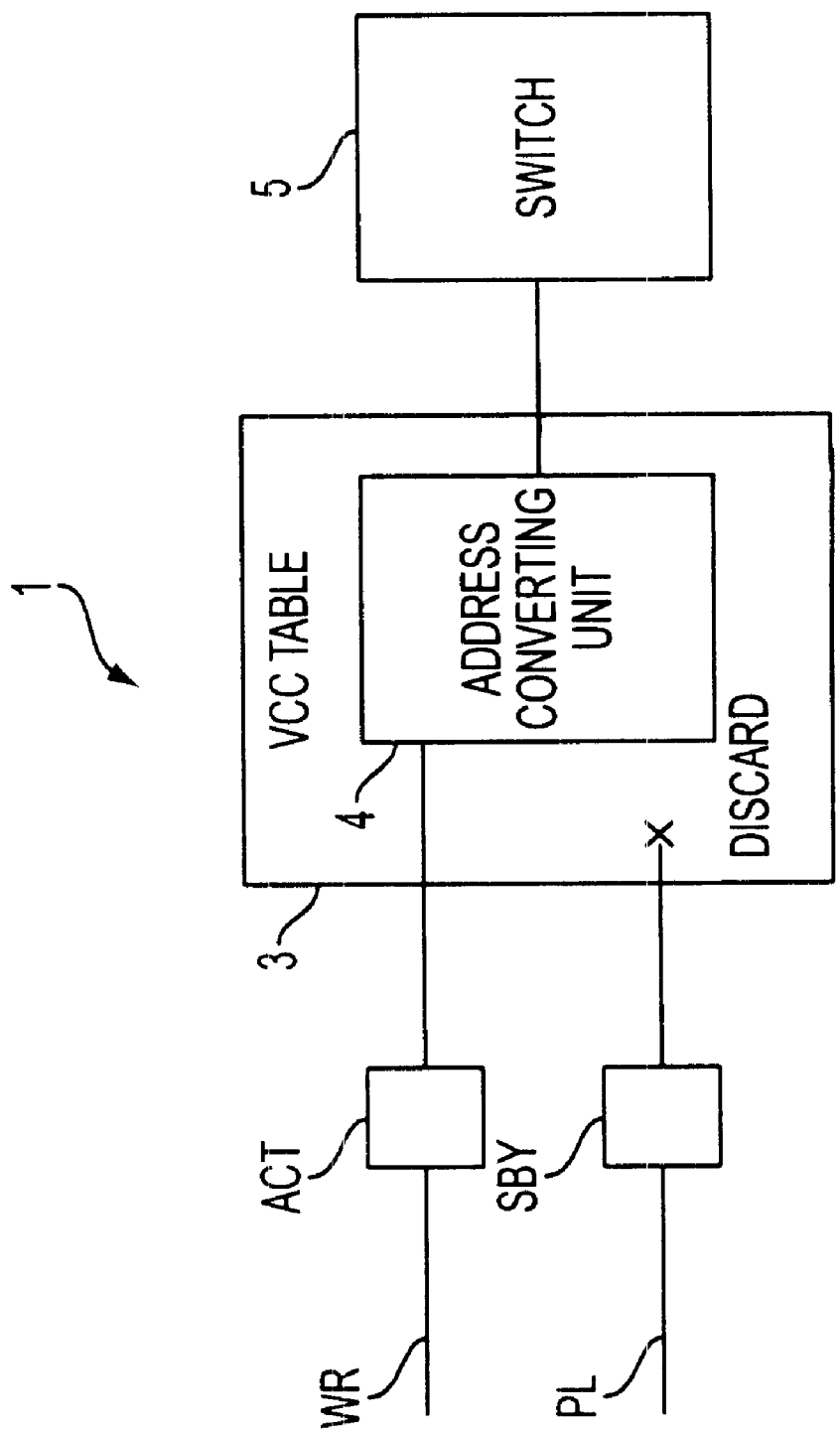
FIG. 12 is an explanatory diagram for explaining the conventional ATM switching unit.

FIG. 12 is an explanatory diagram for explaining a content of the BMT management table 33. In FIG. 12, a bit map read from the P-MP path management table 32 is stored in correspondence with ICID-B in the BMT management table 33. Then, the content stored in this BMT management table 33 is set to the BMT table 21.

Upon receipt of a cell from the switch 17, the SC unit 19 extracts ICID-B stored in a header of this received cell, and reads a bit map corresponding to this extracted ICID-B from the BMT table 21. Subsequently, the SC unit 19 detects a total number of bits set as "1", and copies the cell in accordance with this detected total number. As a result, the cells with the bit number set as "1" are prepared. Subsequently, the SC unit 19 stores specific information (TAG-D) of ports set as "1" based upon the read bit map into the headers of the respective cells. Then, the SC unit 19 sends out the respective cells to the DMUX 22.

Based upon TAG-D stored in the headers of the respective cells received from the SC unit 19, the DMUX 22 transfers the cells to the relevant OVC units 23. The respective cells transferred to the respective OVC units 23 are inputted to the restoring unit 31 (see FIG. 8) connected to the port corresponding to TAG-D. As a consequence, the restoring unit 31 converts ICID-B stored in the header of the inputted cell into O-VPI/VCI. Thereafter, the cell is sent via the port connected to the restoring unit 31 to the transfer line, and then is transferred to another transfer apparatus (not shown).

The ATM switching unit 10a according to the embodiment 2 owns such a merit that the cells can be transmitted in the point-to-multipoint manner in addition to the above-explained effects achieved in the ATM switching unit of the embodiment 1.

What is claimed is:

1. ATM switching unit comprising:

cell receiving means for receiving the same cells from one line as a working line and another line as a protection line;

cell information storing means for receiving the cells from said cell receiving means, and storing the cell received from the working line with an active information indicative of a cell of a presently operable system when there is not a failure at the working line;

discarding means for receiving the cells from said cell information storing means to discard the cell that does not have the active information; and transferring means for receiving the cell from said discarding means, for specifying an output path of the received cell, and for transferring the received cell to the specified output path.

2. An ATM switching unit comprising:

cell receiving means for receiving the same cells from one line as a working line and another line as a protection line;

cell information storing means for receiving the cells from said cell receiving means, and for storing the cell received from the protection line with a standby information indicative of a cell of a spare operable system when there is not a failure at the working line;

discarding means for receiving the cells from said cell information storing means to discard the cell that has the standby information; and transferring means for receiving the cell from said discarding means, for specifying an output path of the received cell, and for transferring the received cell to the specified output path.

3. An ATM switching unit as claimed in claim 1 wherein in the case that there are plural output paths of the cell which is not discarded by said discarding means, said transferring means copies said cell to produce a plurality of copied cells, a total number of which is determined in correspondence with a total number of said plural output paths, and transfers said plural copied cells to said plural output paths.

4. An ATM switching unit comprising:

a first reception line connecting unit for connecting a working line as a reception line of a presently operable system, and for receiving a cell of the presently operable system from the working line;

a second reception line connecting unit for connecting a protection line as a reception line as a reception line of a spare operable system, and for receiving a cell of the spare operable system from the protection line, wherein the cell of the spare operable system is the same as the cell of the presently operable system;

a transfer line connecting unit for connecting a transfer line to transmit the cell being received by any one of said first reception line connecting unit and said second reception line connecting unit;

detecting means for detecting a failure occurred in the working line;

cell information storing means for receiving the cells from said first reception line connecting unit and said second reception line connecting unit, and for storing the cell received from said first reception line connecting unit with an active information indicative of the cell of the presently operable system, wherein said cell information storing unit stores the cell received from said second reception line connecting unit with the active information instead of the cell received from said first reception line connecting unit when the failure occurred in the working line is detected by said detecting means;

cell discarding means for receiving the cells from said cell information storing unit to discard the cell that does not have the active information; and cell transferring means for transferring the cell that is not discarded by said cell discarding means, as the cell of said presently operable system, to said transfer line connecting unit based on transfer destination address information of the cell, which has been stored in a header of the cell of the presently operable system.

5. An ATM switching unit comprising:

a first reception line connecting unit for connecting a reception line of a presently operable system;

a second reception line connecting unit for connecting a reception line of a spare operable system, through which a cell identical to a cell transferred through the reception line of said presently operable system is transferred;

a transfer line connecting unit for connecting a transfer line through which said cell is transmitted, said cell being inputted into any one of said first reception line connecting unit and said second reception line connecting unit;

detecting means for detecting a failure occurred in said reception line of the presently operable system;

cell information storing means for storing cell specific information indicative of the cell of the presently operable system into the cell inputted into said first line connecting unit, and for storing said cell specification information into the cell entered into said second reception line connecting unit instead of the cell entered into said first reception line connecting unit when the failure occurred in the reception line of said presently operable system is detected by said detecting means;

cell discarding means for receiving the cells from said first reception line connecting unit and said second reception line connecting unit to discard such a cell into which said cell specific information is not stored;

cell transferring means for transferring the cell of said presently operable system to said transfer line connecting unit based on transfer destination address information of the cell, which has been stored in a header of the cell of the presently operable system, being equal to the cell not discarded by said cell discarding means;

judging means for judging whether or not the transfer line connected to said transfer line connecting unit is equal to the transfer line of the presently operable system for constituting a duplicated line based on the transfer destination address information of the cell of said presently operable system; and second cell transferring means for copying the cell of said presently operable system when said judging means judges that the transfer line connected to said transfer line connecting unit is equal to the transfer line of the presently operable system; and for transferring a duplicated cell to a second transfer line connecting unit for connecting a transfer line of a spare operation system which constitutes a pair together with said transfer line of the presently operable system.

6. An ATM switching unit comprising:

a first reception line connecting unit for connecting a reception line of a presently operable system;

a second reception line connecting unit for connecting a reception line of a spare operable system, through which a cell identical to a cell transferred through the reception line of said presently operable system is transferred;

a transfer line connecting unit for connecting a transfer line through which said cell is transmitted, said cell being inputted into any one of said first reception line connecting unit and said second reception line connecting unit;

detecting means for detecting a failure occurred in said reception line of the presently operable system;

cell information storing means for storing cell specific information indicative of the cell of the presently operable system into the cell inputted into said first line connecting unit, and for storing said cell specification information into the cell entered into said second reception line connecting unit instead of the cell entered into said first reception line connecting unit when the failure occurred in the reception line of said presently operable system is detected by said detecting means;

cell discarding means for receiving the cells from said first reception line connecting unit and said second reception line connecting unit to discard such a cell into which said cell specific information is not stored; and cell transferring means for transferring the cell of said presently operable system to said transfer line connecting unit based on transfer destination address information of the cell, which has been stored in a header of the cell of the presently operable system, being equal to the cell not discarded by said cell discarding means;

wherein in said ATM switching unit, there are provided a plurality of said transfer line connecting units; and said ATM switching unit is further comprised of:

judging means for judging whether or not said cell of the presently operable system should be transmitted to at least two transfer lines among said plurality of transfer lines connected to said plurality of transfer line connecting units based upon said transfer destination address information of the cell of the presently operable system;

when said judging means judges that the cell of the presently operable system should be transmitted to at least two transfer lines, specifying means for specifying a transfer line connecting unit for connecting at least said two transfer lines;

copying means for copying the cell of said presently operable system in correspondence with the number of transfer line connecting units specified by said specifying means; and cell transferring means for transferring both said cell of the presently operable system and the cell copied by said copying means to the transfer line connecting unit specified by said specifying means.

7. An ATM switching unit comprising:

a first reception line connecting unit for connecting a reception line of a presently operable system;

a second reception line connecting unit for connecting a reception line of a spare operable system, through which a cell identical to a cell transferred through the reception line of said presently operable system is transferred;

a transfer line connecting unit for connecting a transfer line through which said cell is transmitted, said cell being inputted into any one of said first reception line connecting unit and said second reception line connecting unit;

detecting means for detecting a failure occurred in said reception line of the presently operable system;

cell information storing means for storing cell specific information indicative of the cell of the presently operable system into the cell inputted into said first line connecting unit, and for storing said cell specification information into the cell entered into said second reception line connecting unit instead of the cell entered into said first reception line connecting unit when the failure occurred in the reception line of said presently operable system is detected by said detecting means;

cell discarding means for receiving the cells from said first reception line connecting unit and said second reception line connecting unit to discard such a cell into which said cell specific information is not stored;

cell transferring means for transferring the cell of said presently operable system to said transfer line connecting unit based on transfer destination address information of the cell, which has been stored in a header of the cell of the presently operable system, being equal to the cell not discarded by said cell discarding means;

first header converting means for converting both a virtual path identifier and a virtual channel identifier into first reduced information, said virtual path identifier and said virtual channel identifier being stored into headers of the cells inputted into said first reception line connecting unit and said second reception line connecting unit;

second header converting means for converting said first reduced information stored in the header of the cell of the presently operable system into second reduced information produced by reducing said first reduced information and the output path information of the cell of the presently operable system; and third header converting means for converting said second reduced information stored in the header of the cell of the presently operable system into the transfer destination address information of the cell of the presently operable system.

\* \* \* \* \*